United States Patent [19]

Onoue et al.

[11] Patent Number: 5,050,461

[45] Date of Patent: Sep. 24, 1991

[54] ASSIST DEVICE FOR SHIFT OPERATION OF MARINE PROPULSION SYSTEM

[75] Inventors: Akihiro Onoue; Hirofumi Imaeda, both of Hamamatsu, Japan

[73] Assignee: Sanshin Kogyo Kabushiki Kaisha, Hamamatsu, Japan

[21] Appl. No.: 481,976

[22] Filed: Feb. 16, 1990

[30] Foreign Application Priority Data

Feb. 17, 1989 [JP] Japan .................. 1-36110

[51] Int. Cl.⁵ .............................................. B60K 41/04
[52] U.S. Cl. ........................................ 74/872; 440/86
[58] Field of Search ............... 74/480 B, 473 P, 872, 74/858; 440/1, 75, 84, 86, 87

[56] References Cited

U.S. PATENT DOCUMENTS

| | | | |
|---|---|---|---|
| 4,205,738 | 6/1980 | Baba | 74/480 B X |
| 4,262,622 | 4/1981 | Dretzka et al. | 440/84 X |
| 4,432,734 | 2/1984 | Bland et al. | 440/86 X |
| 4,439,163 | 3/1984 | Burmeister et al. | 74/872 X |
| 4,525,149 | 6/1985 | Broughton et al. | 440/75 X |
| 4,683,778 | 8/1987 | Pfalzgraf | 74/858 |
| 4,698,035 | 10/1987 | Ferguson | 74/480 B X |
| 4,817,466 | 4/1989 | Kawamura et al. | 74/872 X |
| 4,838,822 | 6/1989 | Friedle et al. | 440/86 |
| 4,861,295 | 8/1989 | McElroy, Jr. et al. | 440/86 |
| 4,924,724 | 5/1990 | Yoshimura | 440/75 X |

Primary Examiner—Dwight Diehl
Attorney, Agent, or Firm—Ernest A. Beutler

[57] ABSTRACT

An improved shift assist mechanism for a marine propulsion transmission including a shift assist element that is pivotally supported and which defines a slot that receives a member of the linkage that connects the shift operator with the shift control element. Movement of the shift mechanism from either a forward drive position or a reverse drive condition effects pivotal movement of this element and this pivotal movement is employed to actuate a shift assist mechanism that reduces engine speed to assist in shifting.

6 Claims, 5 Drawing Sheets

ASSIST DEVICE FOR SHIFT OPERATION OF MARINE PROPULSION SYSTEM

BACKGROUND OF THE INVENTION

This invention relates to an assist device for the shift operation of marine propulsion system and more particularly to an improved transmission control.

A very popular type of transmission and one which finds wide utility in marine propulsion units employs a pair of counter-rotating bevel gears that are journalled on an output shaft. A dog clutching element is splined on this output shaft and is axially moveable along it into engagement with either one of the driven bevel gears so as to drive the output shaft selectively in forward or reverse direction. In conjunction with such shifting mechanisms, the load required to move the dog clutching element from its engaged position to its disengaged position is quite high. This is particularly true when it is attempted to make a shift with the driven gears being driven at a high rotational speed.

In connection with such transmissions it has, therefore, been proposed to employ a shift assist mechanism which temporarily reduces the engine speed during the time when the transmission is being moved from its driven position. In order to sense the shifting condition, a wide variety of controls have been provided. For the most part, these controls incorporate some form of spring bias lost motion connection so that when high shifting loads are encountered, lost motion is permitted. This lost motion movement is then utilized to actuate a switch for controlling the ignition circuit of the engine to provide speed reduction. Of course, such devices introduce lost motion in the shift mechanism which is not particularly desirable. Furthermore, the use of lost motion connections can require adjustment and limit significantly where the shift assisting device can be located in the system connecting the shift operator with the shifted element.

It is, therefore, a principal object of this invention to provide an improved shift assisting device for a transmission.

It is a further object of the invention to provide a shift assisting device which does not necessitate the incorporation of lost motion in the connection between the shift operator and the shift element.

It is a further object of this invention to provide an improved assisting device wherein the shift sensor can be positioned anywhere in the linkage system between the shift operator and the shift element.

SUMMARY OF THE INVENTION

This invention is adapted to be embodied in a transmission control having an element moveable between a forward drive condition, a reverse drive condition and a neutral condition. An operating member adapted to be operated by an operator is moveable between a forward drive control position, a reverse drive control position and a neutral control position. Linkage means connect the operating member to the transmission element for movement between its conditions in response to movement of the operator member between its positions. A shift assisting element is associated with the linkage means and is moveable between a normal position and a shift assist position in response to movement of the control member from either the forward controlled position or the reverse controlled position toward the neutral control position. A control circuit is operated by movement of the shift assisted element to its shift assist position.

DETAILED DESCRIPTION OF THE PREFERRED EMBODIMENT OF THE INVENTION

Figure 1:
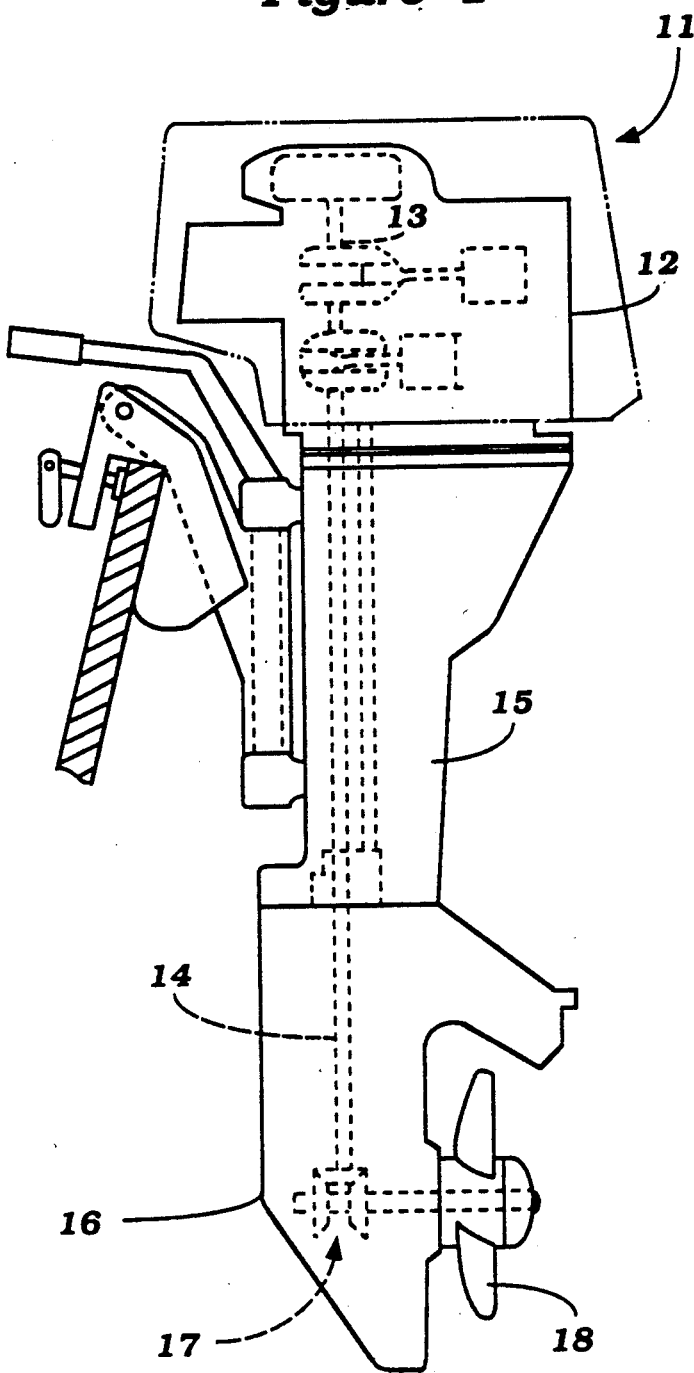
FIG. 1 is a side elevational view of an outboard motor constructed in accordance with an embodiment of the invention.

Referring first to FIG. 1, an outboard motor constructed in accordance with an embodiment of the invention is identified by the reference numeral 11. Although the invention is described in conjunction with an outboard motor, it is to be understood that the invention can be utilized in a wide variety of applications employing transmission of the type herein described. However, such transmission are normally used in outboard drives either in an outboard motor or the outboard drive portion of an inboard/outboard drive and for that reason an outboard motor is shown as a typical environment in which the invention can be employed.

The outboard motor 11 includes a powerhead having an internal combustion engine 12 which, is typical with outboard motor practice, is supported so that its output shaft 13 rotates about a vertically extending axis. The engine 12 may be of any known type.

The engine output shaft 13 is coupled by means of a splined connection to the upper end of a drive shaft 14 that is journalled for rotation within a drive shaft housing 15. The drive shaft 14 depends into a lower unit 16 wherein a forward, neutral, reverse transmission indicated generally by the reference numeral 17, is incorporated for driving a propeller 18 and selected forward and reverse directions.

Figure 2:
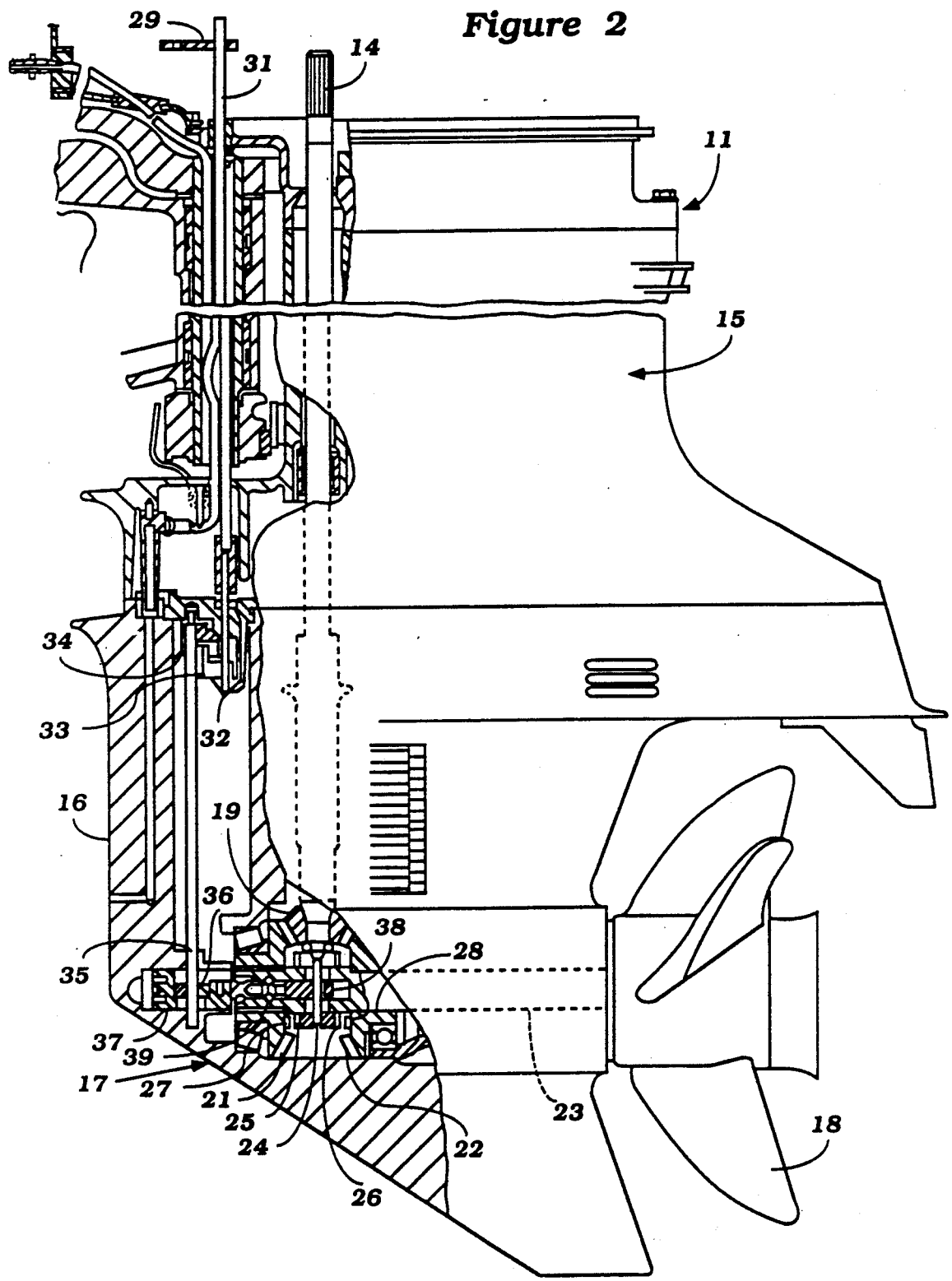
FIG. 2 is an enlarged side elevational view of the drive shaft housing and lower unit with a portion broken away and shown in section.

Referring now to FIG. 2, the outboard motor 11 is shown with the powerhead portion removed and with portions shown in section so as to more clearly illustrate the construction of the forward, neutral, reverse transmission 17. As may be seen, a bevel gear 19 is affixed to the lower end of the drive shaft 14 and meshes with a pair of counter rotating driven gears 21 and 22 which are journalled in a suitable manner for rotation on a propeller shaft 23. The propeller shaft 23 is, in turn, journalled in a suitable manner in the lower unit 16. A dog clutching sleeve 24 has a splined connection to the propeller shaft 23 between the bevel gears 21 and 22 and is axially moveable therealong by means of a shift mechanism to be described.

The dog clutching sleeve 24 has oppositely facing dog clutching teeth 25 and 26 that are adapted to cooperate with corresponding dog clutching teeth 27 and 28 formed on the bevel gears 21 and 22 respectively. FIG. 2 shows the mechanism in its neutral position wherein the dog clutching sleeve 24 is positioned so that the dog clutching teeth 25 and 26 are out of engagement with the teeth 27 and 28. When the dog clutching sleeve 24 is moved to the left, the driven gear 21 will be coupled for rotation with the propeller shaft 23 so as to drive the propeller 18 in a forward direction. Alternatively, when the dog clutching sleeve 24 is shifted to the right as shown in this figure, the dog clutching teeth 26 and 28 will become engaged and the propeller shaft 23 will be driven in a reverse drive condition.

The dog clutching sleeve 24 is reciprocated by means of a shift control mechanism including a control lever 29 that is affixed to an upper shift control rod 31. The lever 29 is rotated, in a manner to be described, so as to rotate the upper shift control rod 31 and a lower shift control rod 32 that has a splined connection to the upper rod. A cam member 33 connected to the lower shift control rod 32 operates a follower 34 that is connected to a shift rod 35 that is journalled in the lower housing 16 for rotating the rod 35 upon rotation of the control lever 29. A cam 36 is affixed for rotation with the lower end of the shift rod 35 and cooperates with a follower 37 supported at one end of the propeller shaft 23. A shift plunger 38 has a connection to the follower 37 and will reciprocate upon rotation of the cam 36 and effect reciprocal movement of the dog clutching sleeve 24. The connection between the follower 37 and the shift plunger 38 is such so a to permit relative rotation but nevertheless transmit reciprocatory movement. Also, a suitable detent mechanism 39 may be incorporated for yieldably restraining the shift control in its neutral condition.

Figure 3:
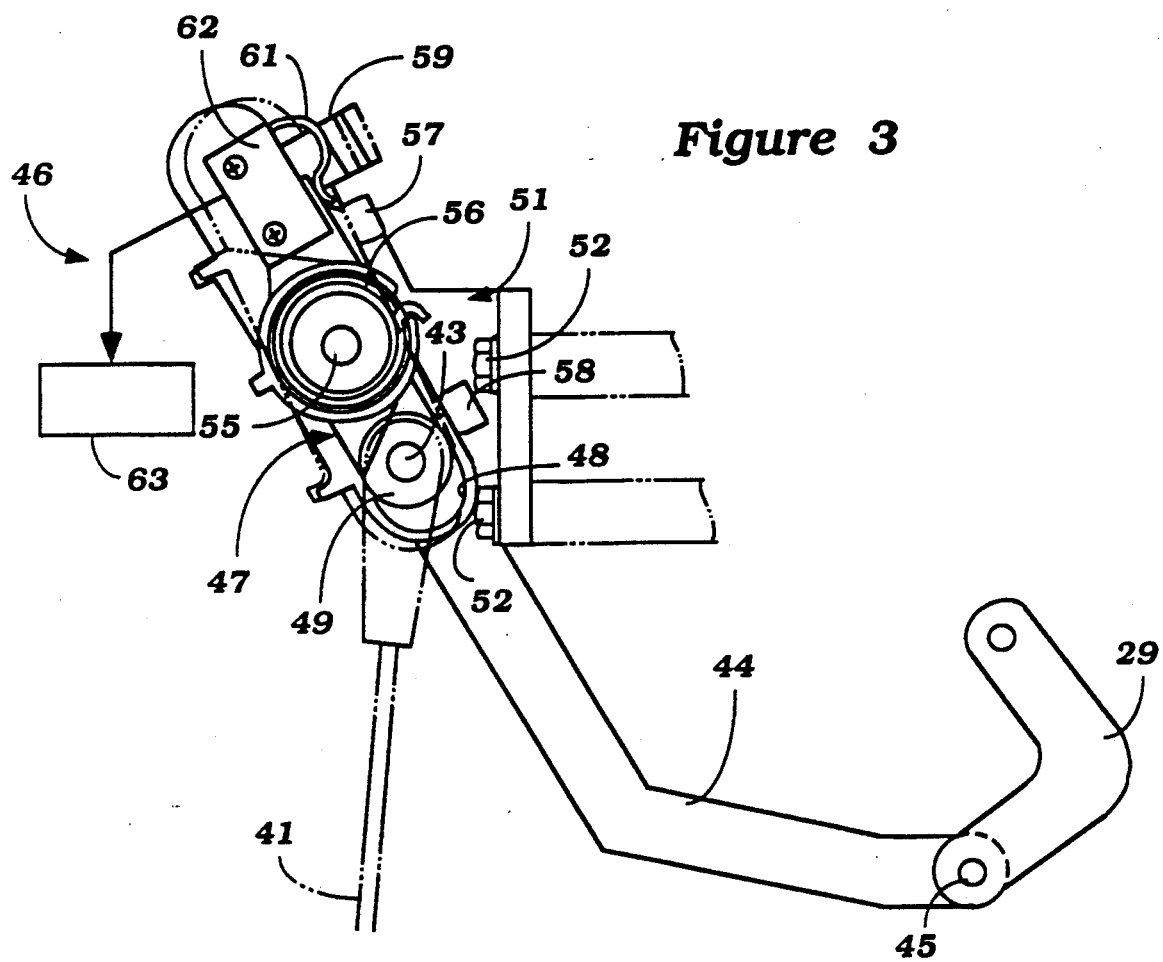
FIG. 3 is a top plan view showing the linkage system interconnecting the shift operator with the transmission control and the associated shift assisting mechanism.
Figure 4:
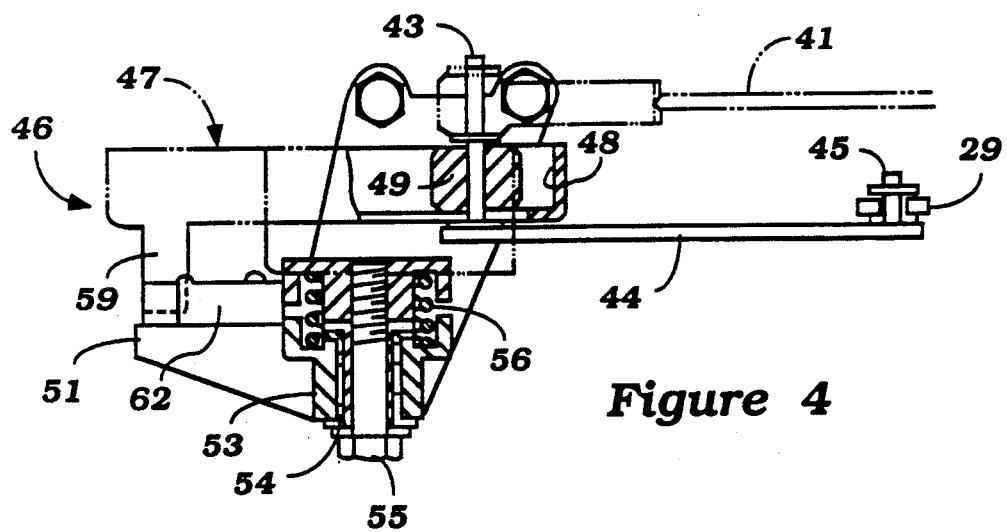
FIG. 4 is a side elevational view, with portions shown in sections of the mechanism shown in FIG. 3.
Figure 5:
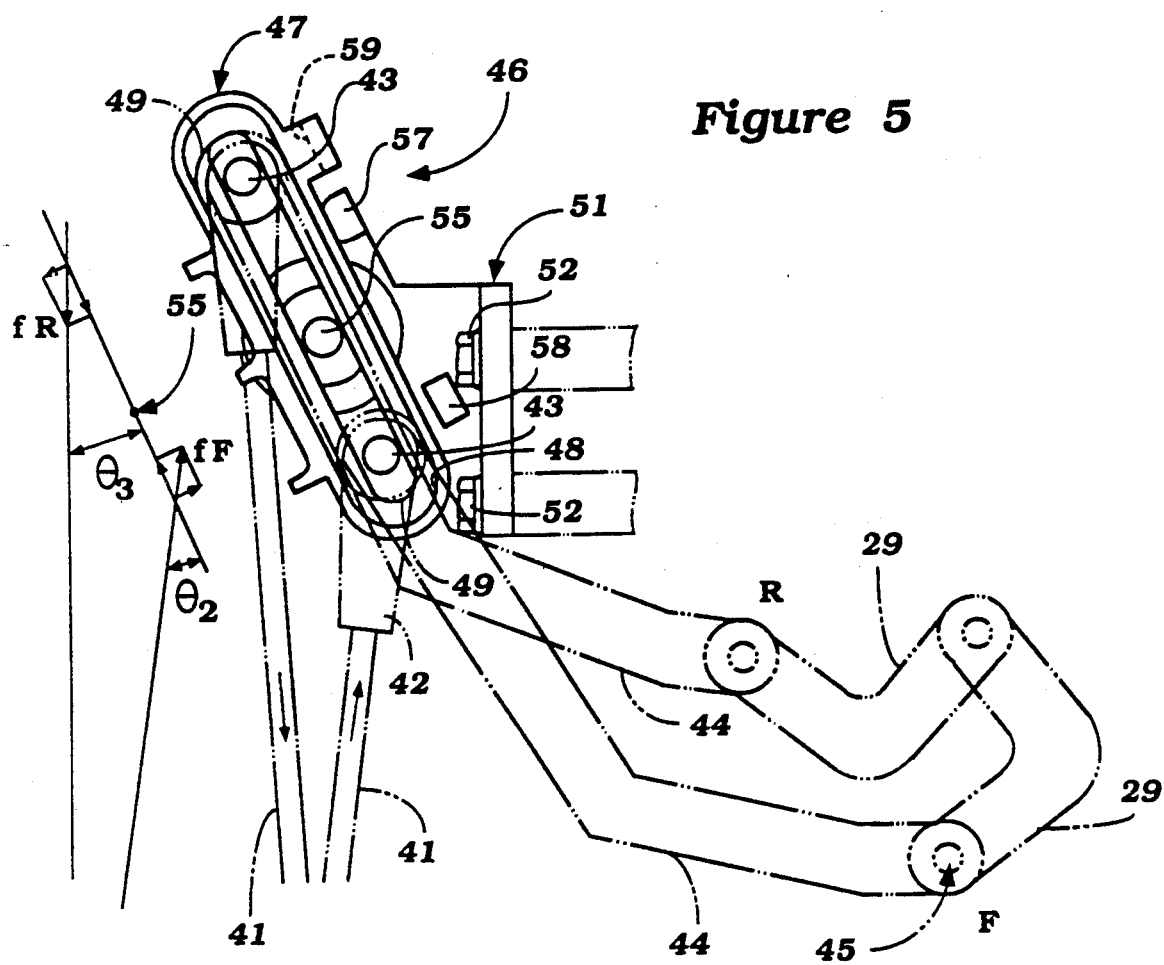
FIG. 5 is a top plan view of the mechanism shown in FIG. 3, with portions removed, and showing the mechanism in the forward drive and reverse drive position with the vector diagrams therefor.
Figure 6:
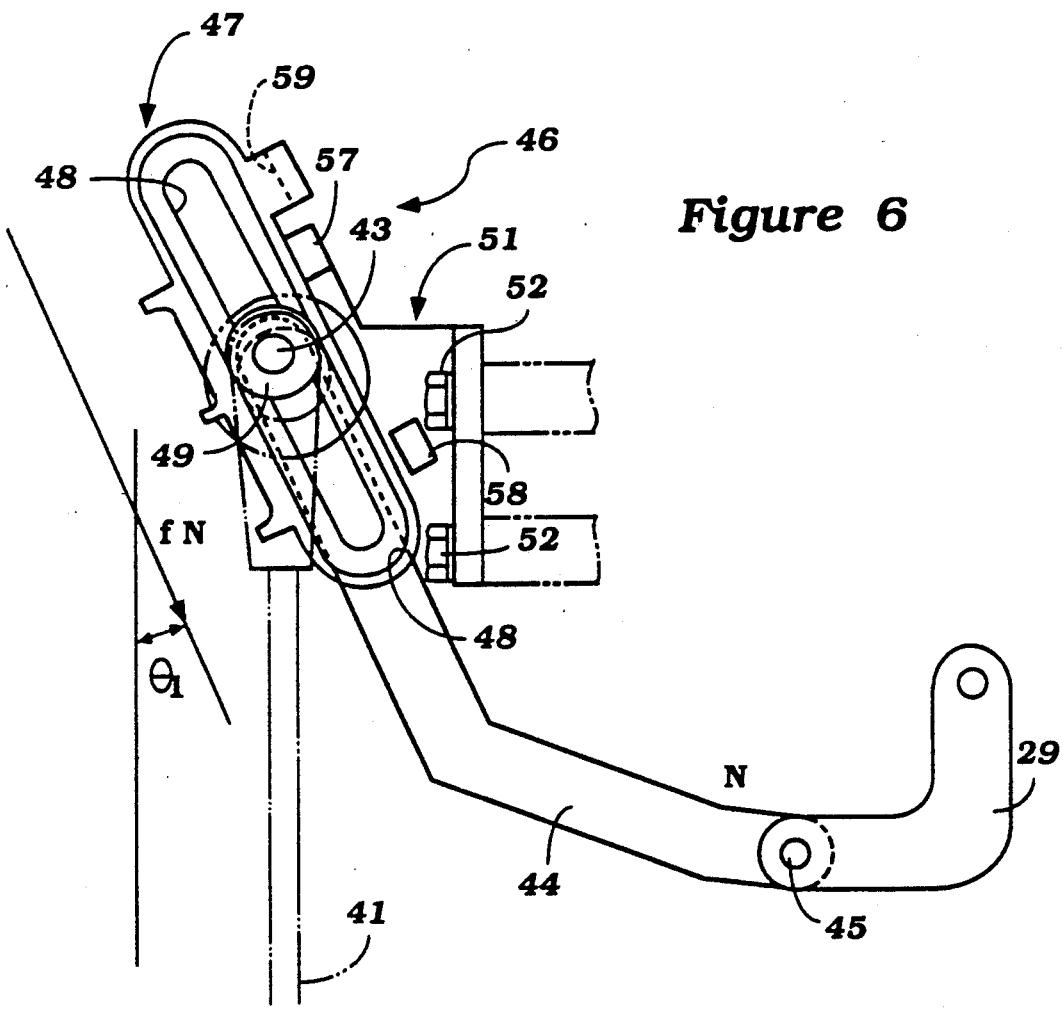
FIG. 6 is a top plan view, in part similar to FIG. 5 and shows the mechanism in its neutral condition and an associated vector diagram.

The mechanism for operating the shift control lever 29 and for providing shift assistance may be best understood by reference to FIGS. 3 through 6. There is provided a remotely located operator (not shown) which may be either positioned within the hull of the associated watercraft or which may be contained within or adjacent the powerhead of the outboard motor 11. This remotely controlled controller operates a shift operator which may comprise a boden wire 41. The boden wire 41 has a fitting 42 affixed to its end which provides a pivotal connection 43 to one end of a link 44. The opposite end of the link 44 is pivotally connected to the shift control lever 29 by means of a pivot pin 45. As a result, reciprocating movement of the wire actuator 41 will effect movement of the link 44 and rotate the shift control lever 29 between its neutral position as shown in FIG. 6 and its forward drive position as shown in FIG. 3 or one of the phantom views in FIG. 5 and its reverse drive position shown in the other phantom view in FIG. 5.

In addition to the shift control mechanism described, there is further provided a shift assist mechanism, indicated generally by the reference numeral 46 which cooperates so as to provide a signal when the transmission is being shifted from either the forward drive position or the reverse drive position that will operate to slow the speed of the engine and make disengagement of the dog clutching teeth 25, 27 or 26, 28, easier. This mechanism 46 includes a cam member 47 that defines a slot or cam groove 48 in which the pivot pin 43 and a roller 49 journalled thereby extends.

The member 47 is journalled on a bracket assembly 51 that is affixed to the drive shaft housing 11 in a suitable manner, as by bolts 52. The bracket 51 has a boss 53 that receives an anti-friction bushing 54 which, in turn, receives a pivot bolt 55. The pivot bolt 55 is threaded into a boss formed in the base of the member 47 and thus journals the member 47 for pivotal movement about an axis defined by the pivot bolt 55.

A torsional spring 56 encircles the pivot bolt and has its ends engaged with the bracket 51 and specifically a portion of its boss 53 and the member 47 for urging the member 47 for rotation about the pivot bolt 55 in a clockwise direction as shown in FIGS. 3, 5 and 6 and into engagement with a fixed stop 57 formed on the bracket assembly 51. This is the normal position for the member 47 and the non shift assist position for this member.

When shifting from either the forward drive position or the reverse drive position occurs and any resistance to this shifting operating is encountered, the member 47 will be rotated in a counter clockwise direction and engage a further fixed limit stop 58 also formed on the bracket 51. When this occurs, a tang 59 formed on the member 47 will urge a contact point 61 of a limit switch 62 to its closed position. When this occurs, a signal will be sent to a control circuit indicated generally by the reference numeral 63 which will energize the control circuit 63 and cause a slowing of the speed of the associated engine in a known manner such as by effecting misfiring of its spark plug or spark plugs. This type of circuit is well known and any of the known circuits used for this purpose may be employed.

Because of the angular inclination of the slot 48 and the cooperation of the roller 49 with it, the counter clockwise pivotal movement will be effected regardless of whether the device is being shifted from forward or reverse drive position as may be best seen in FIG. 5. There is shown in this figure a vector analysis that shows the operation when moving from either the forward position or the reverse position. In either event, a side load will be exerted on the member 47 that tends to rotate it in a counter clockwise direction against the action of the torsional spring 56 so as to cause energization of the switch 62 as aforedescribed.

As may be seen in FIG. 6, however, in the neutral position the axis of the roller 49 coincides with the pivotal axis 55 and no side thrust will be encountered and hence no shift assist operation will be achieved.

From the foregoing description it should be readily apparent that the described mechanism permits the use of a shift assist which can be energized without the use of any lost motion in the shift connection. Furthermore, the arrangement is such that the device 47 may be located anywhere along the shift mechanism where there is pivot pin and hence a greater latitude of design is possible and the unit can be utilized in conjunction with any type of shift mechanism.

The foregoing description is, of course, that of a preferred embodiment to the invention and various changes and modifications may be made without departing from the spirit and scope of the invention, as defined by the appended claims.

We claim:

1. In a transmission control having an element moveable between a forward drive condition, a reverse drive condition and a neutral drive condition, an operating member adapted to be operated by an operator between a forward drive control position, a reverse drive control position and a neutral drive control position, linkage means including a link connecting said operating member to said transmission element for moving said transmission element between its conditions in response to movement of said operating member between its positions, a shift assist element pivotally carried by said link, said shift assist element being formed with a slot receiving said operating member and traversed thereby upon movement of said operating member, the direction of said slot being related to the pivot axis of said shift assist element for movement of said shift assist element between a normal position and a shift assist position in response to movement to said operating member from either of said forward drive control or said reverse drive control positions to said neutral drive control position, and a control circuit operated by movement of said shift assist element to its shift assist position.

2. In a transmission control as set forth in claim 1 wherein the control circuit reduces the speed of an associated engine driving the transmission.

3. In a transmission control as set forth in claim 1 further including biasing spring means for biasing said shift assist element to its normal position.

4. In a transmission control as set forth in claim 3 wherein the slot of the shift assist element is angularly disposed and intersects the pivot axis of said shift assist element.

5. In a transmission control as set forth in claim 4 wherein the operating member received in the slot is aligned with the pivotal axis when the shift mechanism is in its neutral position.

6. In a transmission control as set forth in claim 5 further including fixed stop means against which the shift control element is normally urged by the biasing spring means and second fixed stop means against which the shift assist element is engaged upon movement of the shift assist element from its normal position to its shift assist position.

* * * * *